United States Patent
Hesse et al.

(10) Patent No.: US 7,194,583 B2
(45) Date of Patent: Mar. 20, 2007

(54) CONTROLLING THE REPLACEMENT OF PREFETCHED DESCRIPTORS IN A CACHE

(75) Inventors: Siegfried Kay Hesse, Dresden (DE); Dale E. Gulick, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 533 days.

(21) Appl. No.: 10/464,966

(22) Filed: Jun. 19, 2003

(65) Prior Publication Data

US 2004/0030840 A1    Feb. 12, 2004

(30) Foreign Application Priority Data

Jul. 31, 2002    (DE)    ................. 102 34 990

(51) Int. Cl.
  *G06F 12/00*    (2006.01)
  *G06F 12/12*    (2006.01)
(52) U.S. Cl. ............... 711/137; 711/133; 710/305; 710/313
(58) Field of Classification Search ............. 711/137
  See application file for complete search history.

(56) References Cited

U.S. PATENT DOCUMENTS

| | | | | | |
|---|---|---|---|---|---|
| 4,334,289 | A | * | 6/1982 | Lange et al. ............. | 711/160 |
| 5,136,582 | A | * | 8/1992 | Firoozmand ............. | 370/400 |
| 5,526,511 | A |   | 6/1996 | Swenson et al. | |
| 5,926,841 | A | * | 7/1999 | Novak et al. ............ | 711/208 |
| 6,105,111 | A | * | 8/2000 | Hammarlund et al. ... | 711/136 |
| 6,216,183 | B1 | * | 4/2001 | Rawlins .................. | 710/100 |

(Continued)

FOREIGN PATENT DOCUMENTS

DE    19536819    3/1997

(Continued)

OTHER PUBLICATIONS

"Universal Serial Bus Specification Revision 2.0", Apr. 27, 2000, chapter 10, p. 275-283 and chapter 11, p. 342-346.

(Continued)

*Primary Examiner*—Brian R. Peugh
*Assistant Examiner*—Jesse Diller
(74) *Attorney, Agent, or Firm*—Meyertons Hood Kivlin Kowert & Goetzel, P.C.; B. Noël Kivlin

(57) ABSTRACT

A host controller such as a USB host controller in a southbridge, and a corresponding operation method are provided. The host controller comprises a descriptor fetch unit that is adapted to send out requests for descriptors and receive descriptors in reply to the requests. The descriptors are data structures for describing attributes of the data transfer to and from the devices controlled by the host controller. The host controller further comprises a descriptor cache that is adapted to store prefetched descriptors. The descriptor cache is further adapted to store individual replacement control values for at least a part of the stored prefetched descriptors. The host controller is arranged to replace a stored prefetched descriptor in the descriptor cache by a newly prefetched descriptor based on the replacement control value that is associated with the stored prefetched descriptor. The replacement technique may improve the overall efficiency of the host controller operation.

79 Claims, 10 Drawing Sheets

U.S. PATENT DOCUMENTS

| | | |
|---|---|---|
| 6,266,715 B1 | 7/2001 | Loyer et al. |
| 6,272,499 B1* | 8/2001 | Wooten ........................ 707/102 |
| 6,275,499 B1* | 8/2001 | Wynn et al. ................. 370/438 |
| 6,292,490 B1* | 9/2001 | Gratacap et al. ............ 370/412 |
| 6,311,212 B1 | 10/2001 | Chong et al. |
| 6,349,354 B1 | 2/2002 | Garney |
| 6,546,461 B1* | 4/2003 | Au et al. ..................... 711/131 |
| 2002/0052987 A1* | 5/2002 | Collier ........................ 710/22 |
| 2002/0116565 A1* | 8/2002 | Wang et al. ................. 710/313 |
| 2003/0051076 A1* | 3/2003 | Webber ........................ 710/6 |
| 2003/0079061 A1* | 4/2003 | Azzarito et al. ............... 710/5 |
| 2003/0177297 A1* | 9/2003 | Hesse et al. ................. 710/305 |
| 2003/0221069 A1* | 11/2003 | Azevedo et al. ............ 711/136 |
| 2004/0153588 A1* | 8/2004 | Kasper ........................ 710/52 |
| 2005/0097245 A1* | 5/2005 | Lym et al. ................... 710/52 |

FOREIGN PATENT DOCUMENTS

EP  1102173  5/2001

OTHER PUBLICATIONS

Translation of Official Communication, Application No. 102 34 990.8-53, Jul. 29, 2006, pp. 1-3.

* cited by examiner

CONTROLLING THE REPLACEMENT OF PREFETCHED DESCRIPTORS IN A CACHE

BACKGROUND OF THE INVENTION

1. Field of the Invention

The invention generally relates to host controllers such as USB (Universal Serial Bus) host controllers and in particular to cache mechanisms for storing prefetched descriptors.

2. Description of the Related Art

USB was originally developed in 1995 to define an external expansion bus which facilitates the connection of additional peripherals to a computer system. The USB technique is implemented by PC (Personal Computer) host controller hardware and software and by peripheral friendly master-slave protocols and achieves robust connections and cable assemblies. USB systems are extendable through multi-port hubs.

In USB systems, the role of the system software is to provide a uniformed view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

Hubs are incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implemented in the USB 1.1 specification, this technique was still improved in order to provide a higher performance interface. FIG. 1 illustrates an example USB 2.0 system that comprises a host controller 100, a number of USB devices 115, 120, 125, 130, and two hubs 105, 110. In the system of FIG. 1, the hubs 105, 110 are introduced for increasing connectivity, but in other USB 2.0 systems, the USB devices can be connected directly to the host controller 100.

As mentioned above, USB 2.0 provides a higher performance interface, and the speed improvement may be up to a factor of 40. Moreover, as apparent from FIG. 1, USB 2.0 is backwards compatible with USB 1.1 because it allows for connecting USB 1.1 devices 120, 125, 130 to be driven by the same host controller 100. There may even be used USB 1.1 hubs 110.

As can be seen from FIG. 1, a USB 1.1 device 120 can be connected directly to a USB 2.0 hub 105. Moreover, it can also be connected directly to the host controller 100. This is made possible by the capability of USB 2.0 host controllers and hubs to negotiate higher as well as lower transmission speeds on a device-by-device basis.

Turning now to FIG. 2, the system software and hardware of a USB 2.0 system is illustrated. The system components can be organized hierachially by defining several layers as shown in the figure.

In the upper most layer, the client driver software 200 executes on the host PC and corresponds to a particular USB device 230. The client software is typically part of the operating system or provided with the device.

The USB driver 205 is a system software bus driver that abstracts the details of the particular host controller driver 210, 220 for a particular operating system. The host controller drivers 210, 220 provide a software layer between a specific hardware 215, 225, 230 and the USB driver 205 for providing a driver-hardware interface.

While the layers discussed so far are software implemented, the upper most hardware component layer includes the host controllers 215, 225. These controllers are connected to the USB device 230 that performs the end user function. Of course, for one given USB device, the device is connected to either one of the host controllers 215, 225 only.

As apparent from the figure, there is one host controller 225 which is an enhanced host controller (EHC) for the high speed USB 2.0 functionality. This host controller operates in compliance with the EHCI (Enhanced Host Controller Interface) specification for USB 2.0. On the software side, host controller 225 has a specific host controller driver (EHCD) 220 associated.

Further, there are host controllers 215 for full and low speed operations. The UHCI (Universal Host Controller Interface) or OHCI (Open Host Controller Interface) are the two industry standards applied in the universal or open host controllers (UHC/OHC) 215 for providing USB 1.1 host controller interfaces. The host controllers 215 have assigned universal/open host controller drivers (UHCD/OHCD) 210 in the lowest software level.

Thus, the USB 2.0 compliant host controller system comprises driver software and host controller hardware which must be compliant to the EHCI specification. While this specification defines the register-level interface and associated memory-resident data structures, it does not define nor describe the hardware architecture required to build a compliant host controller.

Referring now to FIG. 3, the hardware components of a common motherboard layout are depicted. The basic elements found on a motherboard may include the CPU (Central Processing Unit) 300, a northbridge 305, a southbridge 310, and system memory 315. The northbridge 305 usually is a single chip in a core-logic chipset that connects the processor 300 to the system memory 315 and the AGP (Accelerated Graphic Port) and PCI (Peripheral Component Interface) buses. The PCI bus is commonly used in personal computers for providing a data path between the processor and peripheral devices like video cards, sound cards, network interface cards and modems. The AGP bus is a high-speed graphic expansion bus that directly connects the display adapter and system memory 315. AGP operates independently of the PCI bus. It is to be noted that other motherboard layouts exist that have no northbridge in it, or that have a northbridge without AGP or PCI options.

The southbridge 310 is usually the chip in a system core-logic chipset that controls the IDE (Integrated Drive Electronics) or EIDE (Enhanced IDE) bus, the USB bus, that provides plug-and-play support, controls a PCI-ISA (Industry Standard Architecture) bridge, manages the keyboard/mouse controller, provides power management features, and controls other peripherals.

In southbridges and other integrated circuit chips used to control the data traffic in computer systems, host controllers such as USB host controllers may make use of descriptors. A descriptor is a data structure with a defined format, holding information which is descriptive for some related matters.

For instance, the USB specification defines descriptors of a rather high protocol level. Such descriptors may be used by USB devices to report their attributes. Other descriptors are for instance those defined in sections 3.3 to 3.7 of the EHCI Rev. 1.0 specification. Such descriptors describe attributes of the data transfer to and from the devices that are controlled by the host controller.

When using descriptors in host controllers, the descriptors may be fetched by sending out requests for descriptors and receiving descriptors in reply to the requests. This may however becomes a rather inefficient mechanism, in particular if descriptors need to be accessed rapidly. However, when prefetching descriptors in advance, a significant storage capacity is required that may inappropriately complicate the circuit structure of the device.

SUMMARY OF THE INVENTION

An improved descriptor processing technique for host controllers is provided that may improve the efficiency of the overall device operation while keeping the storage capacity needed for storing descriptors in a reasonable range.

In an embodiment, a host controller is provided that comprises a descriptor fetch unit that is adapted to send out requests for descriptors and receive descriptors in reply to the requests. The descriptors are data structures for describing attributes of the data transfer to and from devices controlled by the host controller. The host controller further comprises a descriptor cache that is adapted to store prefetched descriptors. The descriptor cache is further adapted to store individual replacement control values for at least a part of the stored prefetched descriptors. The host controller is arranged to replace a stored prefetched descriptor in the descriptor cache by a newly prefetched descriptor based on the replacement control value associated with the stored prefetched descriptor.

In another embodiment, there may be provided a southbridge device that has a USB host controller circuit. The USB host controller circuit comprises a descriptor fetch unit that is adapted to send out requests for descriptors and receive descriptors in reply to the requests. The descriptors are data structures for describing attributes of the data transfer to and from USB devices. The USB host controller circuit further comprises a descriptor cache that is adapted to store prefetched descriptors. The descriptor cache is further adapted to store individual replacement control values for at least a part of the stored prefetched descriptors. The USB host controller circuit is arranged to replace a stored prefetched descriptor in the descriptor cache by a newly prefetched descriptor based on the replacement control value associated with the stored prefetched descriptor.

In still another embodiment, a method of operating a host controller is provided. The method comprises prefetching descriptors by sending out requests for descriptors and receiving descriptors in reply to the requests. The descriptors are data structures for describing attributes of the data transfer to and from devices controlled by the host controller. The method further comprises accessing a descriptor cache of the host controller. The descriptor cache stores prefetched descriptors. The descriptor cache further stores individual replacement control values for at least a part of the stored prefetched descriptors. The method further comprises replacing a stored prefetched descriptor in the descriptor cache by a newly prefetched descriptor based on the replacement control value associated with the stored prefetched descriptor.

In a further embodiment, a computer system comprises a host controller for controlling the data traffic to and from at least one peripheral device connected to the computer system over a serial bus. The host controller comprises a descriptor fetch unit that is adapted to send out requests for descriptors and receive descriptors in reply to the requests. The descriptors are data structures for describing attributes of the data transfer to and from peripheral devices controlled by the host controller. The host controller further comprises a descriptor cache that is adapted to store prefetched descriptors. The descriptor cache is further adapted to store individual replacement control values for at least a part of the stored prefetched descriptors. The host controller is arranged to replace a stored prefetched descriptor in the descriptor cache by a newly prefetched descriptor based on the replacement control value associated with the stored prefetched descriptor.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

In the embodiments, prefetched descriptors are stored in a descriptor cache together with individual replacement control values for at least a part of the stored prefetched descriptors. A stored prefetched descriptor in the cache is replaced by a new descriptor based on the replacement control value associated with the stored prefetched descriptor. It will be described in more detail below that the replacement control value may be a sympathy value that is indicative of the usefulness of storing the respective descriptor in the descriptor cache. In another embodiment, the replacement control value may be a precalculated value.

In the following, descriptors are thought to be of that kind describing attributes of the data transfer to and from the devices that are controlled by the host controller. As mentioned above, such descriptors are for instance those defined in sections 3.3 to 3.7 of the EHCI specification. However, other descriptors of this kind may exist as well.

Noting that other embodiments may relate to host controllers other than USB host controllers, the following more detailed description relates to the example of a host controller in a USB system.

Figure 1:
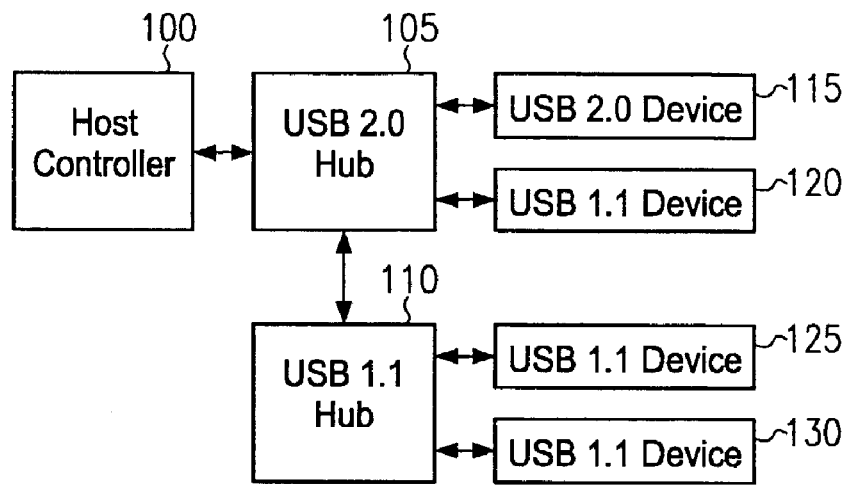
FIG. 1 illustrates an example USB 2.0 compliant system.
Figure 2:
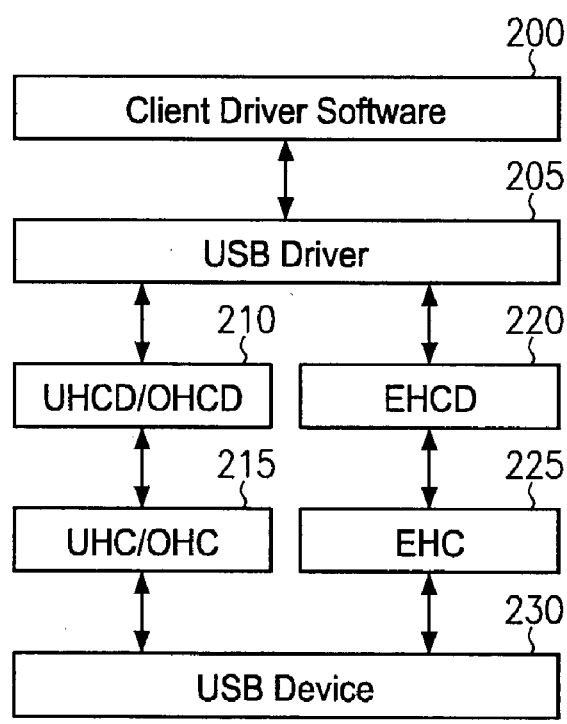
FIG. 2 illustrates the hardware and software component layers in the system of FIG. 1.
Figure 3:
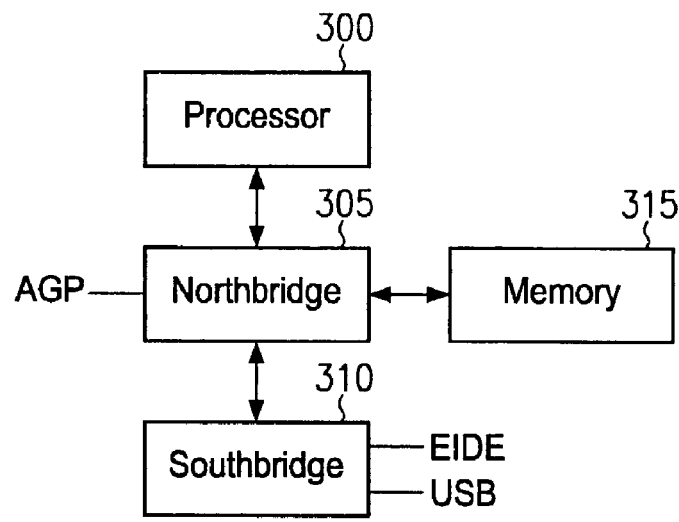
FIG. 3 illustrates a common motherboard layout.
Figure 4:
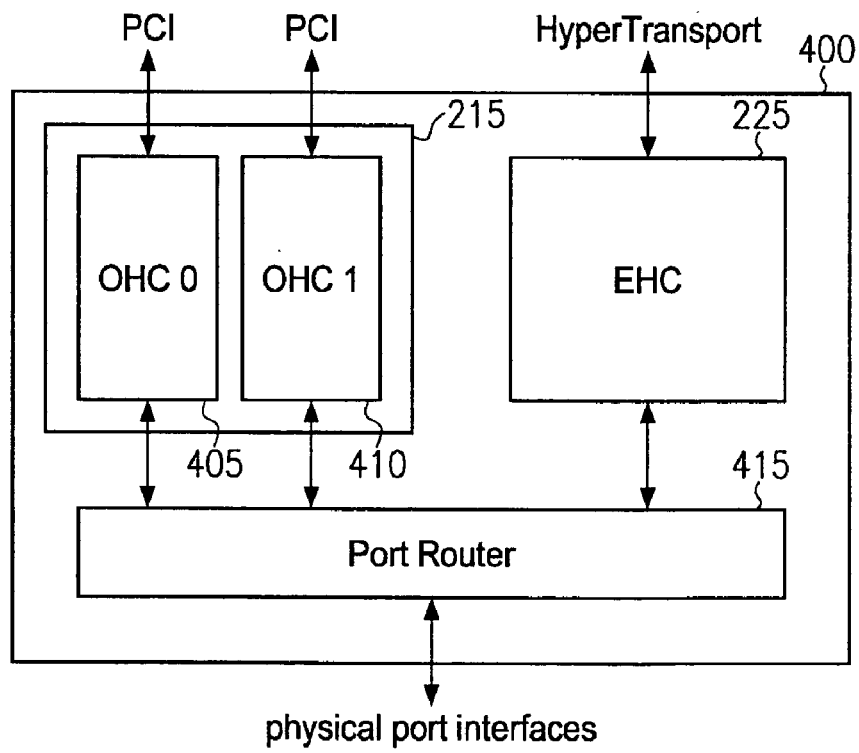
FIG. 4 illustrates the main components of the USB 2.0 compliant host controller according to an embodiment.

Referring now to the drawings and particularly to FIG. 4, the main components of a USB 2.0 compliant host controller 400 according to an embodiment are shown. In general, the host controller consists of three main components: the enhanced host controller (EHC) 225, one or more companion host controllers 215, and the port router 415.

The enhanced host controller 225 handles the USB 2.0 high speed traffic. Additionally, it controls the port router 415.

In the companion host controller unit 215 of the present embodiment, there are two OHCI compliant host controllers, OHC0 405 and OHC1 410. These controllers handle all USB 1.1 compliant traffic and may contain the legacy keyboard emulation for non-USB aware environments.

The port router 415 assigns the physical port interfaces their respective owners. This ownership is controlled by EHC registers, and per default all ports are routed to the companion host controllers in order to allow for a system with only USB 1.1 aware drivers to function. If a USB 2.0 aware driver is present in the system it will assign the ports to either a companion host controller 405, 410 for low and full speed devices and hubs (USB 1.1 traffic) or to the EHC 225 for high speed devices and hubs.

That is, the USB 2.0 host controller shown in FIG. 4 complies with the EHCI specification and allows for using existing OHCI USB 1.1 host controllers with the minimum alteration necessary to interface to the port router block 415, instead of USB 1.1 physical devices.

Plug-and-play configuration may be handled separately by each host controller 405, 410, 225. There may be an EHCI-imposed restriction that the OHCI controllers 215 must have lower function numbers than the EHCI controller 225.

The USB 2.0 compliant host controller of FIG. 4 may be defined as hardware architecture to implement an EHCI-compliant host controller for integration into a southbridge 310. The host controller then resides between the USB-2 analog input/output pins and a link interface module for interfacing upstream towards system memory, e.g. interfacing to a northbridge if there is one present in the system. This interface may be an internal HyperTransport™ interface. The HyperTransport technology is a high speed, high performance point-to-point link for interconnecting integrated circuits on a motherboard. It can be significantly faster than a PCI bus for an equivalent number of pins. The HyperTransport technology is designed to provide significantly more bandwidth than current technologies, to use low-latency responses, to provide low pin count, to be compatible with legacy PC buses, to be extensible to new system network architecture buses, to be transparent to operating systems, and to offer little impact on peripheral drivers.

Thus, in the embodiment of FIG. 4 a HyperTransport-based USB host controller is provided where an enhanced host controller 225 is responsible for handling all high speed USB traffic as well as controlling port ownership for itself and the companion controllers 215 via the port router 415. After power-on reset or software-controlled reset of the EHC 225, it may default to a state where all ports are owned and controlled by the companion host controllers 215, all operational registers are at their respective default values, and the EHC 225 is halted, i.e. it neither fetches descriptors from system memory 315 nor issues any USB activity. In normal operation, the EHC 225 may process asynchronous and interrupt transfers from a periodic list, bulk and control from an asynchronous list. Either list can be empty or its processing disabled by software.

Figure 5:
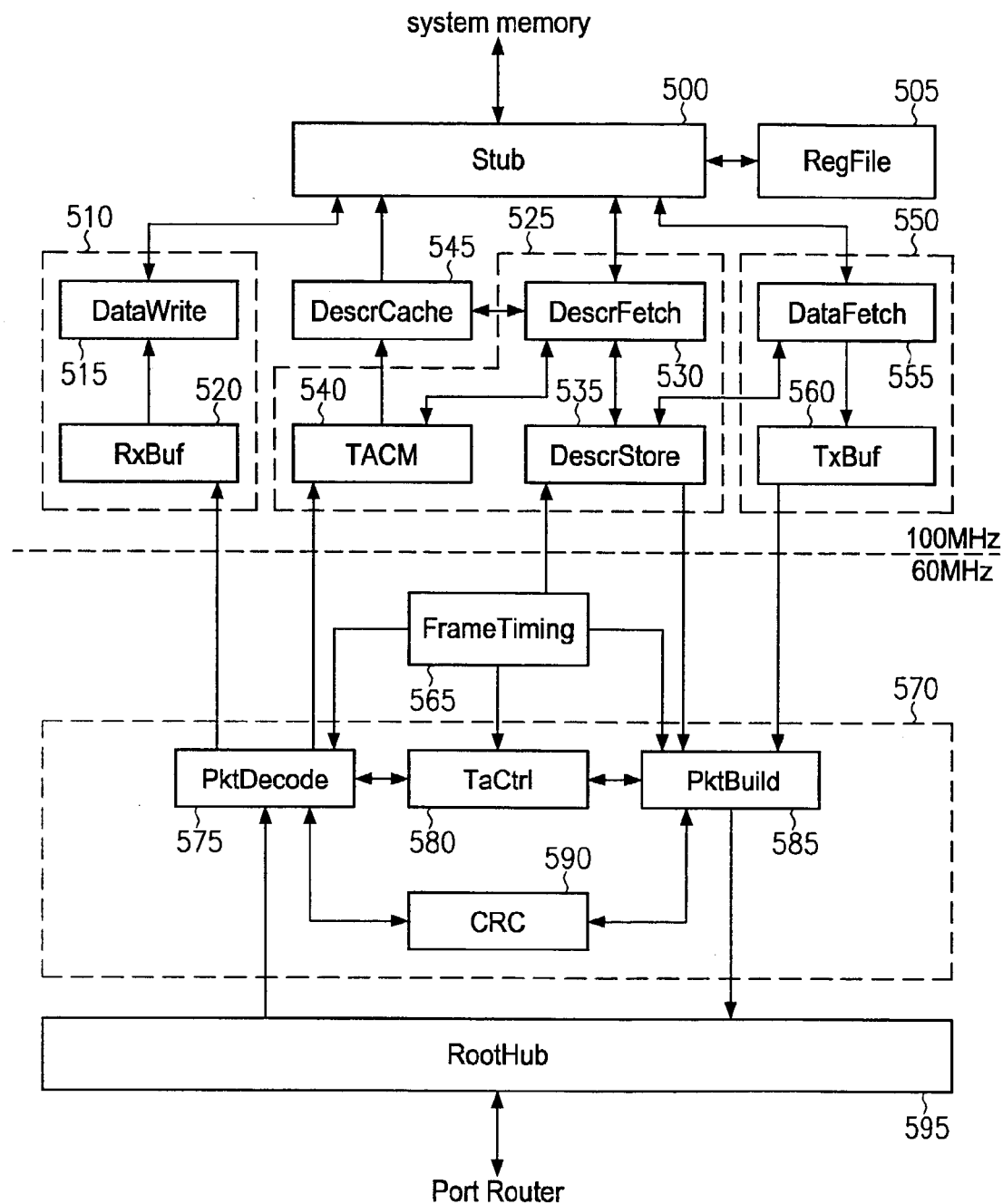
FIG. 5 is a block diagram illustrating the components of the enhanced host controller that is a component of the arrangement of FIG. 4.

Turning now to FIG. 5, the components of the enhanced host controller EHC 225 are depicted in more detail. As can be seen from the figure, the enhanced host controller 225 can be divided into a 100 MHz core clock domain and a 60 MHz clock domain. While the 60 MHz clock domain includes the circuitry for routing transactions to physical devices, the 100 MHz clock domain does the actual descriptor processing. It is to be noted that in other embodiments, the domains may have clock rates different from the above values of 100 MHz and 60 MHz. In these embodiments, the descriptor processing domain clock still has a frequency as high as the other domain, or even higher.

In the 100 MHz domain, handling of the data traffic to and from the system memory is done by the stub 500. The stub 500 assigns the internal sources and sinks to respective HyperTransport streams, i.e. posted requests, non-posted requests, responses. The stub 500 arbitrates the internal HyperTransport interface between all internal bus masters, i.e. the receive DMA (Direct Memory Access) engine 510, the descriptor cache 545, the descriptor processing unit 525 and the transmit DMA engine 550. Thus, the stub 500 arbitrates between descriptor fetching, writing descriptors back, receiving and transmitting data.

The stub 500 is connected to a register file 505 that contains the EHCI registers. In the present embodiment, the EHCI registers store data with respect to the PCI configuration, the host controller capabilities and the host controller operational modes.

The descriptor processing unit 525 is connected to stub 500 and includes three subunits: the descriptor fetching unit (DescrFetch) 530, the descriptor storage unit (DescrStore) 535 and the transaction completion machine (TACM) 540. The descriptor fetching unit 530 determines, based on timing information and register settings, which descriptor is to be fetched or prefetched next and sends the request to the stub 500 and/or to the descriptor cache 545. When it receives the descriptor it sends it to the descriptor storage unit 535.

The descriptor storage unit 535 holds the prefetched descriptors. By performing storage management, its main function is to provide a storage capacity to average memory access latencies for descriptor fetches.

The transaction completion machine 540 is connected to the descriptor fetching unit 530 for managing the status write-back to descriptors. For this purpose, the transaction completion machine 540 is connected to the descriptor cache 545.

This cache contains descriptors which have been prefetched by the descriptor fetching unit 530 for fast re-access. The descriptors held in the descriptor cache 545 are updated by the transaction completion machine 540 and eventually written back to system memory, via stub 500. The descriptor cache 545 may be fully associative with write-through characteristics. It may further control the replacement of the contents dependent on the age of the stored descriptors.

As apparent from FIG. 5, there are further provided the transmit DMA engine 550 and the receive DMA engine 510. The transmit DMA engine 550 includes a data fetching unit (DataFetch) 555 and a data transmit buffer (TxBuf) 560. The data fetching unit 555 is the DMA read bus master and inspects the entries in the descriptor storage unit 535 of the descriptor processing unit 525. The data fetching unit 555 prefetches the corresponding data and forwards it to the data transmit buffer 560.

The data transmit buffer 560 may be a FIFO (first in first out) buffer, and its function corresponds to that of the descriptor storage unit 535 in that it allows to prefetch enough data for outgoing transactions to cover the memory system latency. The data transmit buffer 560 may further serve as clock domain translator for handling the different clocks of the domains.

The receive DMA engine 510 includes the data writing unit (DataWrite) 515 which serves as DMA write bus master unit for moving the received data that are stored in the data receive buffer (RxBuf) 520, to its respective place in system memory. The data receive buffer 520 may be a simple FIFO buffer and may also serve as clock domain translator.

In the 60 MHz clock domain, there is provided a frame timing unit (Frame-Timing) 565 that is the master USB time reference. One clock tick of the frame timing unit corresponds to an integer (e.g. 8 or 16) multiple of USB high speed bit times. The frame timing unit 565 is connected to the descriptor storage unit 535 and to the packet handler block 570.

The packet handler block 570 includes a packet building unit (PktBuild) 585 that constructs the necessary USB bus operations to transmit data and handshakes, and a packet decoder (PktDecode) 575 that disassembles received USB packets. Further, a transaction controller (TaCtrl) 580 is provided that supervises the packet building unit 585 and the packet decoder 575. Further, the packet handler 570 comprises a CRC (cyclic redundancy check) unit 590 for generating and checking CRC data for transmitted and received data.

The packet building unit 585 and the packet decoder 575 of the packet handler 570 are connected to the root hub 595 that contains port specific control registers, connect detection logic and scatter/gather functionality for packets between the packet handler 570 and the port router.

Figure 6:
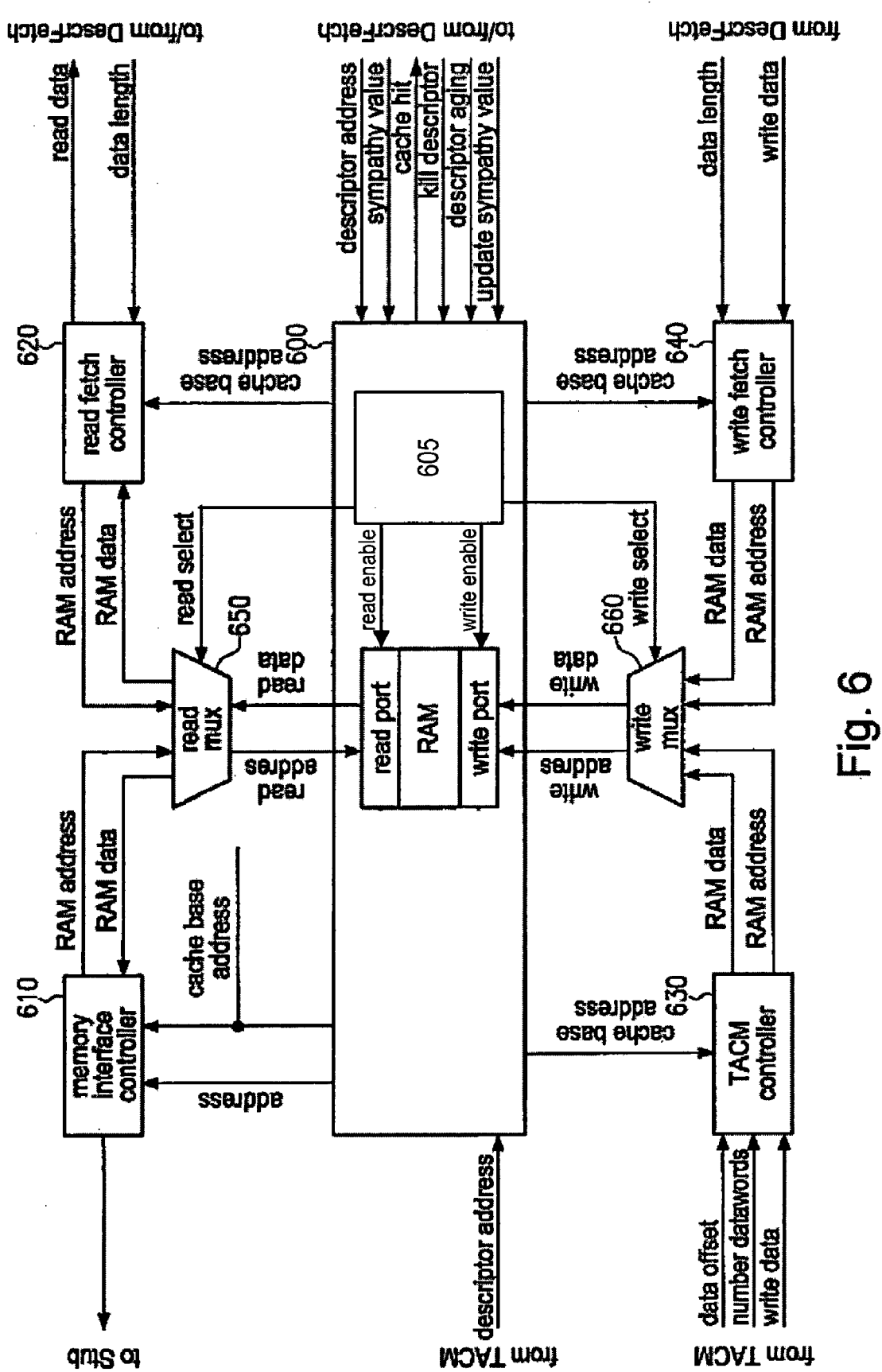
FIG. 6 is a block diagram illustrating the components of the descriptor cache that is a part of the enhanced host controller shown in FIG. 5.

Turning now to FIG. 6, the components of the descriptor cache 545 are shown in more detail. As mentioned above, the descriptor cache 545 caches transfer descriptors fetched by the descriptor fetch unit 530 for faster re-access. The cache 545 of the present embodiment works in a fully associative, write-through manner. Two sources can read from and write into the cache: the descriptor fetch unit 530, and the transaction completion machine 540. In the present embodiment, the descriptor fetch unit 530 and the transaction completion machine 540 never access the same descriptor.

A sympathy value is updated periodically each microframe, i.e., it is replaced by the new value calculated by the descriptor fetch unit 530 just accessing a given descriptor. In addition, or as an alternative embodiment, the sympathy value is updated for each new fetch. Periodic descriptors will expire naturally at frame boundaries. Asynchronous descriptors are tagged with their age and will not be held any longer than two, three or four frames to guarantee coherency with system memory where software might have changed them. Further, descriptors may be invalidated by the transaction completion machine 540 when it retires a descriptor. A descriptor may be pushed out when there is a new one with a higher sympathy value and there are no more free cache entries.

In the present embodiment, the cache memory can store a maximum number of sixteen descriptors, containing a maximum of sixteen doublewords each being thirty-two bits wide. As can be seen from FIG. 6, a RAM (Random Access Memory) unit 600 is provided for this purpose. The embedded RAM is organized as 256×32 bits. The higher four address lines are used for descriptor base addressing and the four lower address lines are used to address the data words inside the descriptor. The RAM unit 600 of the present embodiment comprises separate read and write ports that allow concurrent read and write operations. For write-through operations from the transaction completion machine 540 and the descriptor fetch unit 530, there may exist reserved RAM resources located at the descriptor based address 0×15 at the end of the address space.

The number of cached periodic and asynchronous descriptors may be reported permanently to the register file 505.

The descriptor cache 545 of FIG. 6 further comprises a read fetch controller 620 and a write fetch controller 640 that support read and write transfers from and to the descriptor fetch unit 530 on demand. Further, a TACM controller 630 is provided that accepts data from the transaction completion machine 540 on demand. Moreover, a memory interface controller 610 is provided that reads data from the RAM unit 600 and writes it to the memory interface 500.

The RAM unit 600 may further comprise a dataflow controller 605 for controlling the data transfer between the descriptor cache 545 and the transaction completion machine 540. The dataflow controller 605 may use the information stored inside tags to come to decisions. Further, the dataflow controller 605 may control read and write multiplexers 650, 660 that multiplex the various descriptor sources and sinks to and from the RAM unit 600.

Moreover, the dataflow controller 605 may also control enable signals of the embedded RAM. The address and data lines of the embedded RAM are controlled directly from the writing or reading submodules and are routed through the multiplexers 650, 660.

If the normal cache operation is disabled, the descriptor cache 545 may operate in a write-through mode as follows: The descriptor cache 545 uses the memory 600 for write-through operations. Further, the descriptor fetch unit 530 will never get a cache hit. The write-through from the descriptor fetch unit 530 and the transaction completion machine 540 is possible. Aging and killing descriptors may be ignored. Moreover, starting read requests from the descriptor fetch unit 530 may be forbidden, and data from the descriptor fetch unit 530 with write-through activated will not be written into the cache 545.

Discussing now in more detail the operation of the descriptor fetch unit 530, this unit is responsible for retrieving the appropriate data structures from system memory or from the descriptor cache 545. The descriptor fetch unit 530 calculates the sympathy value for the descriptor cache 545 and interacts with the descriptor storage unit 535 to determine when to switch back and forth between the periodic and the asynchronous schedule, respectively. Basically, the descriptor fetch unit 530 of the present embodiment carries out the following algorithm:

```
If PeriodicScheduleEnable then begin
    while PeriodicList != empty begin
        wait for space in DescrStore
        if Subroutine:DoFetch == ok then begin
            calculate SympathyValue for DescrCache
            replace Descriptor.NextPtr with Descriptor.SelfPtr
            send Descriptor to DescrStore
        end
    end
end
if AsyncScheduleEnable then begin
    while AsyncList != empty begin
        while DescrStore.full begin
            if DescrStore.OverThreshold then break
        end
        while next QueueHead == DescrStore.Head begin
            if DescrStore.OverThreshold then break
        end
        if subroutine:DoFetch == ok
            calculate SympathyValue for DescrCache
            replace Descriptor:NextPtr with Descriptor.SelfPtr
            send Descriptor to DescrStore
        end
    end
end
Subroutine:DoFetch
    if next Descriptor in DescrCache then
        fetch from DescrCache
    else
        fetch from system memory
    if Descriptor is QueueHead then begin
        if !QueueHead.Active && !QueueHead.Halted then begin
            if QueueHead.TotalBytes > 0
                && QueueHead.AltNext.Tbit != 1 then
                fetch QueueHead.AltNext ->qTD from system memory
            elsif QueueHead.NextPtr.TBit != 1 then
                fetch QueueHead.NextPtr->qTD from system memory
            else
                return fail
            do overlay and write back QueueHead
            if fetched !QueueHead.Active then
                return fail
        end
    end
end sub
```

In the special case of a frame-wrapping split asynchronous transaction as described in sections 4.12.3.1 and 4.12.3.3.2.1 of the EHCI specification, the descriptor fetch unit 530 may be required to read the previous descriptor from the descriptor cache 545 before it can update it. Due to the sympathy value given to those frame-wrapped descriptors they will almost certainly be found in the descriptor cache 545. Otherwise, the descriptor fetch unit 530 will read the descriptor from memory via the memory interface 500.

The descriptor fetch unit 530 may also calculate an estimated time duration needed for the descriptor's transaction(s) to complete, and present it to the descriptor storage unit 535. There may be up to four such estimated duration values for one descriptor: one per transaction (i.e. up to three for a high-bandwidth transfer) and the sum for the whole transfer (i.e. the sum of the previous three). These values may be used to support a duration management in the descriptor storage unit 535. The descriptor fetch unit 530 may use the best-fit approximation algorithm described in section 4.4.1.1 of the EHCI specification to determine the estimated value for each transaction.

As mentioned above, sympathy values are used in the present embodiment to provide a means of estimating the usefulness of caching a certain descriptor in favour of others (if there are more descriptors than cache places) and therefore to determine which descriptor in the cache is to be replaced by the newly fetched one. Thus, the sympathy values are indicative of the usefulness for each descriptor. The descriptor with the lowest sympathy value may be discarded first. It may be a basic rule to make the sympathy value the only criterion to decide upon, i.e., no additional information like descriptor types etc are necessary. This means that sympathy values for different descriptor types may need to belong to one consistent value range.

Further, sympathy values may be updated on a regular basis, e.g. each microframe, and/or at each new fetch. The sympathy values may also be stored as a tag to each descriptor. Thus, minimizing the bit width of the sympathy values advantageously minimizes the memory overhead incurred by storing the sympathy values.

It may be another basic rule to establish reasonable privilege constraints. For instance, periodic descriptors may be generally prioritized better than asynchronous descriptors, but sufficient emphasis may be given to asynchronous descriptors for long transactions. Further, single transaction descriptors, e.g. setup descriptors, may be prevented from being cached. Moreover, back-linked descriptors may get prioritized over all others.

Calculating sympathy values may be based on the finding that the more often a descriptor is visited the more useful is it to cache it. Thus, the number of further re-visits may be calculated based on the type and state of the descriptor and the microframe number. A more compact representation may be used which may be a linear function of the number of re-visits for periodic descriptors while for asynchronous descriptors, an estimate of the logarithm of the number of re-visits is used. A linear function for periodic descriptors may be sufficient when periodic descriptors are not visited more often than, e.g., eight times so that the number of re-visits would be seven at maximum. Applying a logarithm function leads to an exponential advantage for periodic descriptors with big data load. For instance, a six re-visits periodic descriptor will get the same sympathy value as an eight re-visits asynchronous descriptor.

Examples of how sympathy values may be calculated for periodic schedule descriptors are given in this table:

| Descriptor Type | Calculation Algorithm |
|---|---|
| iTD<br>non-split iso | for (u=current_uF+1; u<8; u++) begin<br>    if iTD.XferLen[u]>0 then<br>        SympathyValue += 2;<br>end |
| siTD<br>split iso OUT | for (u=current_uF+1; u<8; u++) begin<br>    if siTD.SMask[u] == 1 then<br>        SympathyValue += 2;<br>end |
| siTD<br>split iso IN | AMask = siTD.SMask \| siTD.CMask<br>for (u=current_uF+1; u<8; u++) begin<br>    if AMask[u] == 1 then<br>        SympathyValue += 2;<br>end<br>if current_uF==7 && siTD.BackPtr.T== 0 then<br>    SympathyValue += 20h |
| QH<br>non-split intr | for (u=current_uF+1; u<8; u++) begin<br>    if QH.SMask[u]==1 then<br>        SympathyValue += 2;<br>end |
| QH<br>split intr | if QH.SplitXState==DoStart then<br>    if QH.SMask[current_uF]==1 then<br>        SympathyValue = 8<br>    else<br>        SympathyValue = 6<br>else begin<br>    for (u=0; u<8; u++) begin<br>        if QH.SMask[current_uF+u+1]==1 then |

-continued

| Descriptor Type | Calculation Algorithm |
| --- | --- |
| | break |
| |         if QH.Cmask[current_uF+u+1]==1 then |
| |            SympathyValue += 2 |
| |         end |
| | end |
| Active==0 or Halted==1 | SympathyValue = 0 |
| ANY | if (current_uF==0) && (RecoveryPathMode) then |
| |     SympathyValue = 20h |

For asynchronous descriptor, sympathy values may be calculated according to the following rules:

| Descriptor Type | Calculation Algorithm |
| --- | --- |
| QH non-split async (bulk, ctrl data, but not SETUP), split async (bulk, SETUP & ctrl data) | t = MSBset(QH.TotalBytes) |
| | nom = t*4 |
| | if t>0 && QH.TotalBytes[t-1]==1 then |
| |     nom += 2 |
| | p = MSBset(QH.MaxPLen) |
| | denom = p*4 |
| | if p>0 && QH.MaxPLen[p-1]==1 then |
| |     denom += 1 |
| | else |
| |     denom -= 1 |
| | if denom > nom then |
| |     SympathyValue = 0 |
| | else |
| |     SympathyValue = nom - denom |
| | if SympathyValue > 31 then |
| |     SympathyValue = 31 |
| non-split SETUP or Active==0 or Halted==1 | sympathyvalue = 0 |

Figure 7:
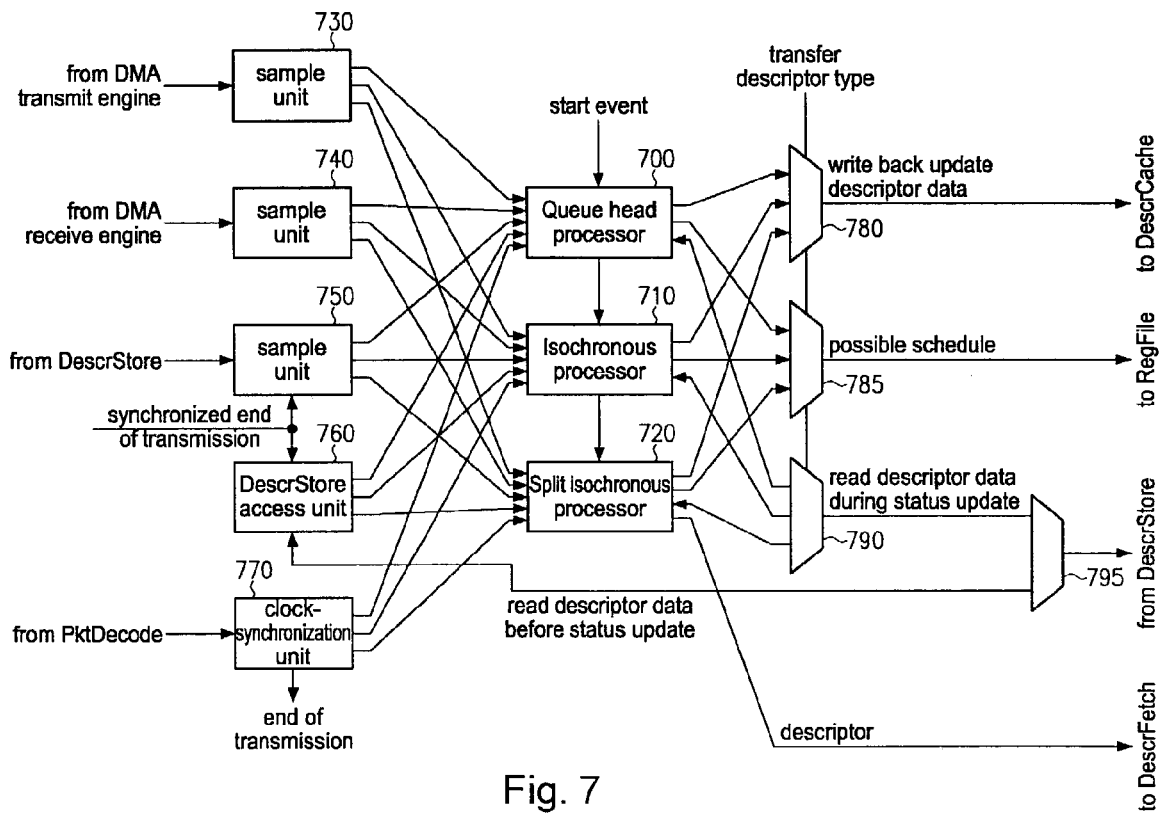
FIG. 7 is a block diagram illustrating the components of the transaction completion machine that is a part of the enhanced host controller shown in FIG. 5.

It is now referred to FIG. 7 which illustrates the components of the transaction completion machine 540 in more detail. As mentioned above, the transaction completion machine 540 of the present embodiment is responsible for updating and possibly retiring descriptors after transactions on the USB bus. In order to do so, it will gather information from the descriptor storage unit 535 to get the currently processed descriptor, and from the DMA transmit and receive engines 550, 510 to get the amount of data moved.

The transaction completion machine 540 updates the descriptors and writes the updated descriptors into the descriptor cache 545. The descriptor cache 545 will write the update descriptors through to the memory interface 500 in a write-through mode.

As apparent from FIG. 7, the transaction completion machine 540 comprises a queue head processor 700, a non-split isochronous processor 710, and a split isochronous processor 720. The queue head processor 700 of the present embodiment is responsible for status updates for all transactions that are captured by the queue head data structure as described in the EHCI specification. These transactions are nonsplit/split bulk/control/interrupt in/out/setup transaction. The transaction type is given as part of the descriptor data structure.

As further apparent from FIG. 7, there may be provided an isochronous processor 710 that is responsible for status updates for all nonsplit isochronous transactions that are captured by the iTD data structure as described in the EHCI specification. Moreover, a split isochronous processor 720 may be provided that is responsible for status updates for all split isochronous transactions that are captured by the siTD data structure described in the EHCI specification.

The transaction completion machine 540 of FIG. 7 further comprises sample units 730–750 that receive data from the DMA transmit and receive engine 550, 510 and the descriptor storage unit 535, respectively. Moreover, there are provided multiplexers 780–790 for multiplexing signals to the descriptor cache 545, to the register file 505, and from the descriptor storage unit 535, respectively. Before the status update, descriptor data may be read from the descriptor storage unit 535 to the descriptor storage access unit 760. Moreover, a packet handler synchronization unit 760 is provided that is responsible for synchronization of all signals coming from the packet handler 570 which is in the 60 MHz clock domain, and for capturing the signals at the occurrence of the end-of-transmission event. The clock synchronization unit 770 realizes the interface to the packet handler 570, in particular to the packet decoder 575.

The functioning of the descriptor cache 545, the descriptor fetch unit 530, the transaction completion machine 540, the descriptor storage unit 535, and the packet handler 570 will become more apparent from FIGS. 8 to 15 which show timing charts of the signals at the various interfaces between the units.

Figure 8:
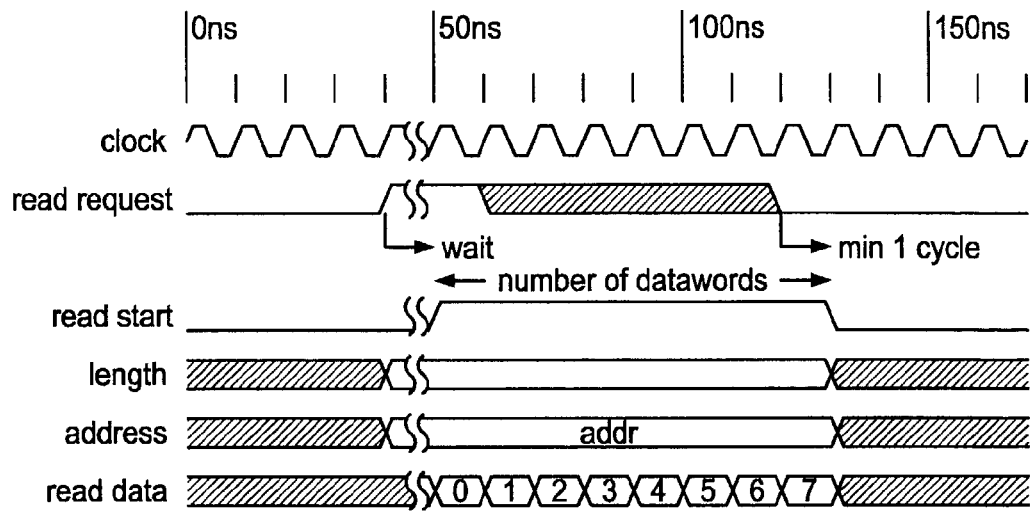
FIG. 8 is a timing chart illustrating the signals in a descriptor read operation at the interface between the descriptor cache and the descriptor fetch unit of the enhanced host controller shown in FIG. 5.

Turning first to FIG. 8, a timing chart relating to the interface between the descriptor cache 545 and the descriptor fetch unit 530 is provided. The depicted signals show a descriptor read operation where eight data words are read from the descriptor cache 545.

Figure 9:
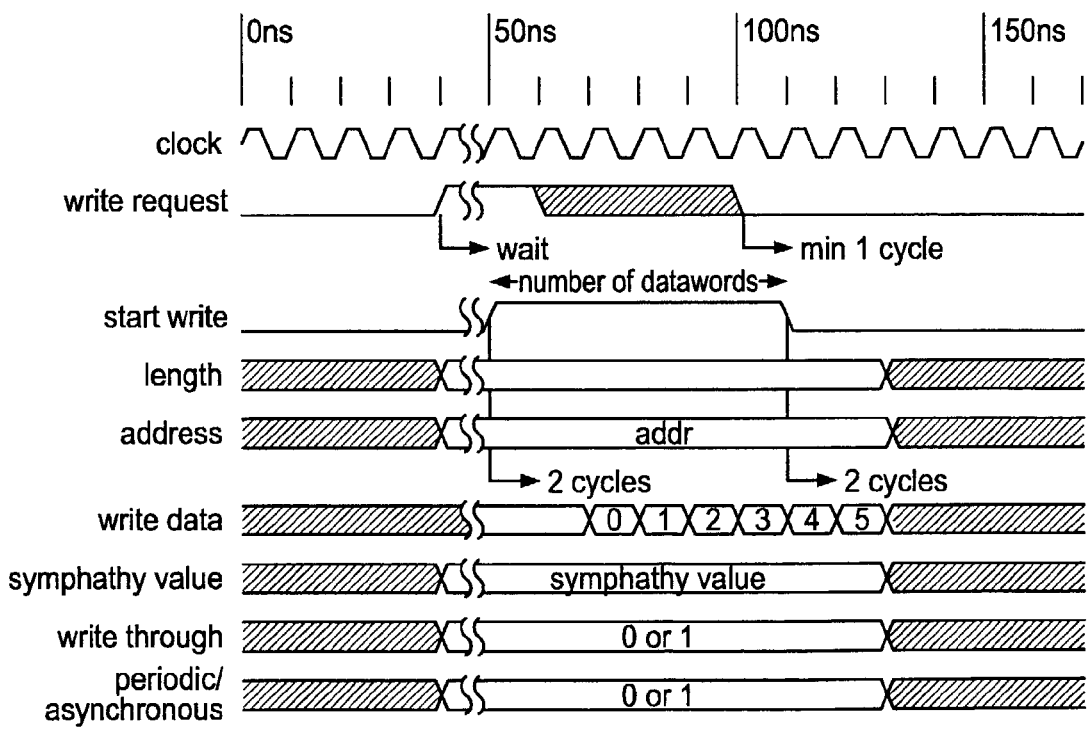
FIG. 9 is a timing chart illustrating the signals of a corresponding descriptor write operation.

FIG. 9 is the corresponding timing chart relating to a descriptor write operation. In the example of FIG. 9, six data words are written into the descriptor cache 545.

Figure 10:
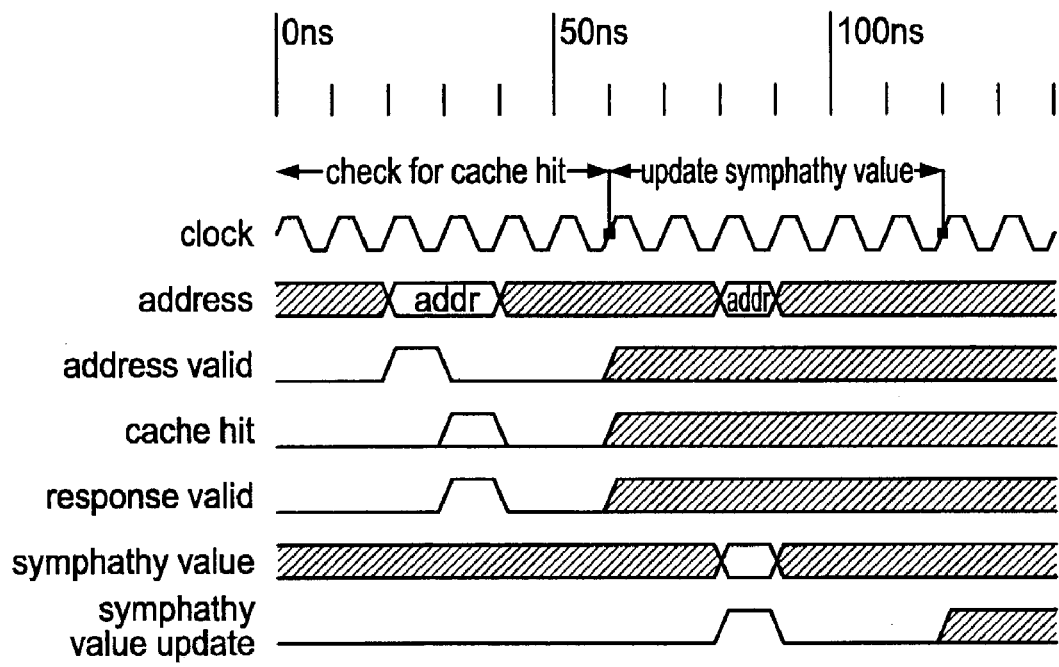
FIG. 10 is a timing chart illustrating miscellaneous operations at the interface between the descriptor cache and the descriptor fetch unit.
Figure 11:
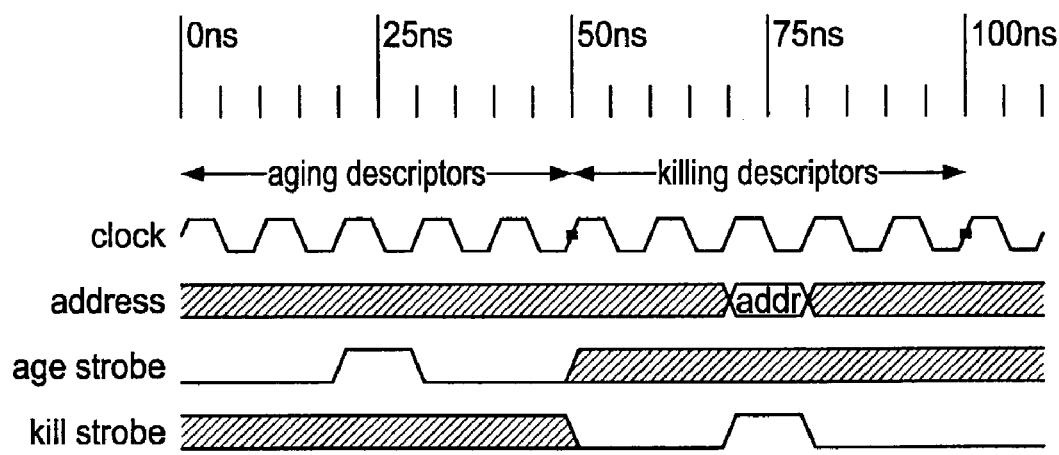
FIG. 11 is a timing chart illustrating other miscellaneous operations at the interface.

Miscellaneous other descriptor operations at the interface between the descriptor cache 545 and the descriptor fetch unit 530 are given in the timing charts of FIGS. 10 and 11. In the signal forms of FIG. 10, a check for a cache hit is performed first. Then the sympathy value is updated. The operation shown in FIG. 11 relate to the aging and killing of descriptors.

Figure 12:
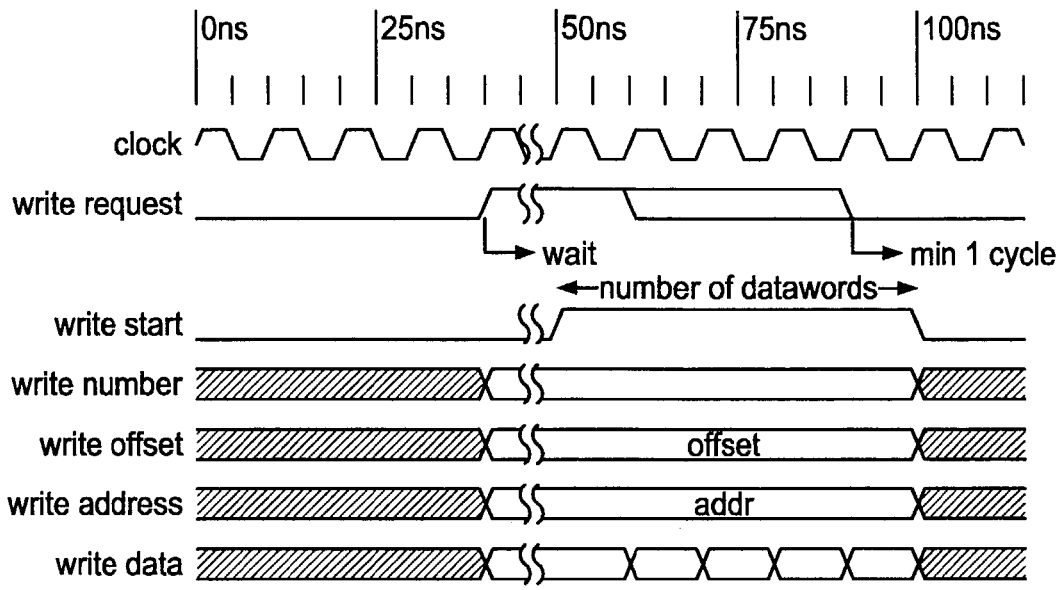
FIG. 12 is a timing chart illustrating signals of a write operation of the transaction completion machine.
Figure 14:
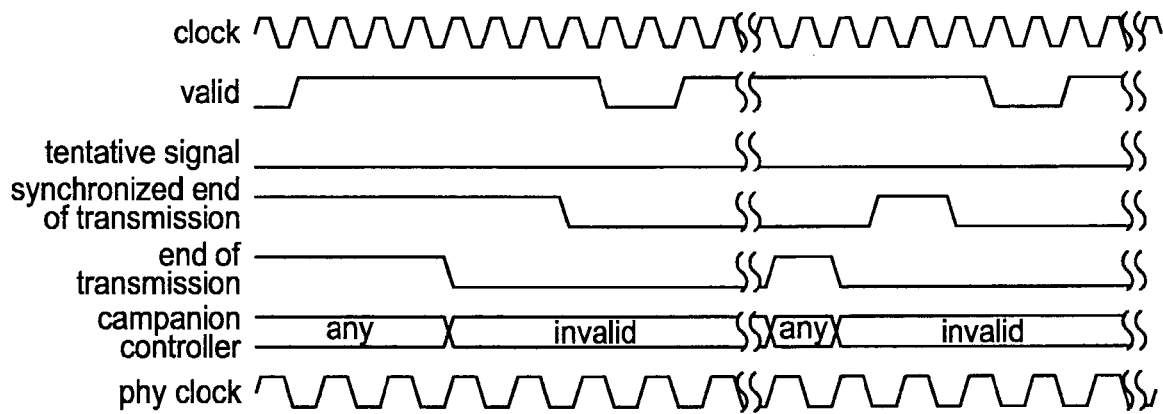
FIG. 14 is a timing chart illustrating signals at the interface between the packet handler and the descriptor storage unit, making use of non-tentative transaction items.
Figure 13:
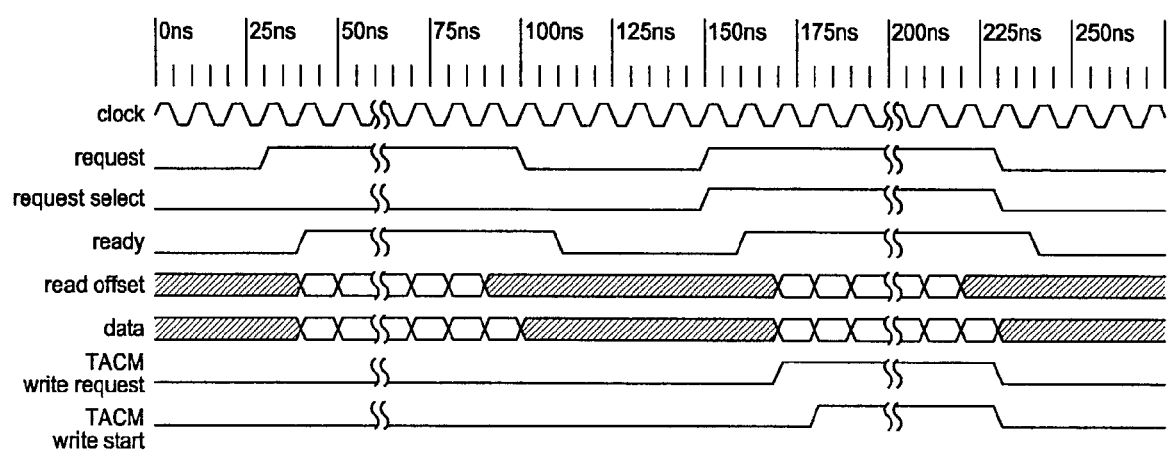
FIG. 13 is a timing chart illustrating signals at the interface between the transaction completion machine and the descriptor storage unit that is a component of the enhanced host controller of FIG. 5.

Turning now to the timing chart of FIG. 12, the depicted signals relate to the interface between the descriptor cache 545 and the transaction completion machine 540. In the example of FIG. 12, the transaction completion machine 540 writes five data words into the descriptor cache 545.

As discussed above, the transaction completion machine 540 may further access the descriptor storage unit 535. This is shown in more detail in FIG. 13 where the transaction completion machine 540 reads data from the descriptor storage unit 535 and writes data to the descriptor cache 545.

In order to minimize a clock domain translation delay between the descriptor storage unit 535 and the packet handler 570, the descriptor storage unit 535 may provide the next transaction item as soon as the previous got absorbed by the packet handler 570 which is indicated by the end-of-transmission signal going low. This is illustrated in the timing chart of FIG. 14.

Figure 15:
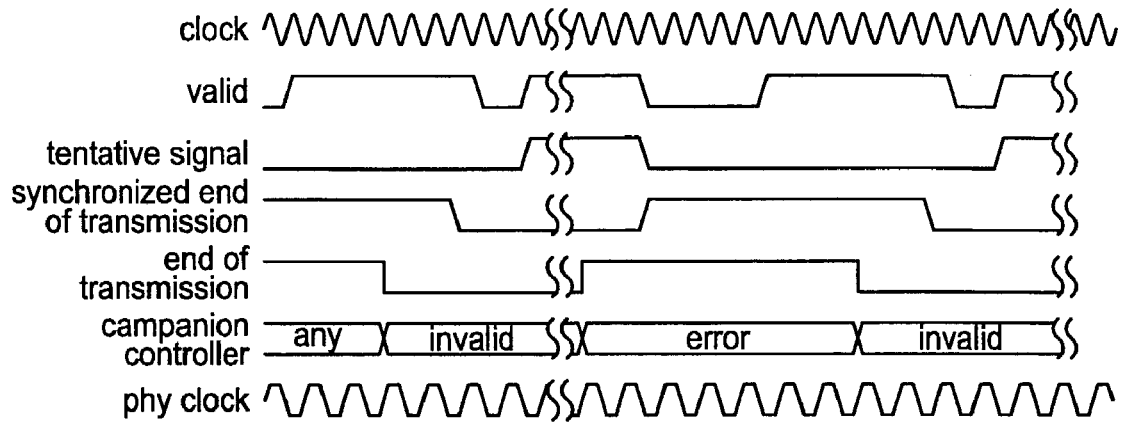
FIG. 15 is a timing chart corresponding to that of FIG. 14 but making use of tentative transaction items.

In case of a high-bandwidth transaction, the maximum number of transaction items may be three. If one of the intermediate transaction fails, or if a short packet condition on an incoming transaction occurred, then the pre-converted transaction item may become invalid. For this reason, such transaction items may be marked as tentative as shown in FIG. 15. If the packet handler 570 returns from a transaction with a transaction failure flag set, and the descriptor storage unit 535 has marked the current transaction item as tentative, then the packet handler 570 of the present embodiment must not use this transaction item. Instead, it waits for the valid signal going low again, what indicates that the descriptor storage unit 535 has become aware of the failed previous transaction. Then, only the next time when the valid signal is asserted, the transaction item is valid.

The tentative signal may play another role during complete split transactions. If the packet handler 570 has detected that the transaction to be performed is a complete split transaction and if the transaction is marked as a tentative transaction, it may repeat the last transaction immediately if it has returned with the transaction failure flag set. If the last transaction was completed without error, the packet handler 570 waits for the valid signal going low again and only the next time the valid signal is asserted, the transaction item becomes valid.

Figure 16:
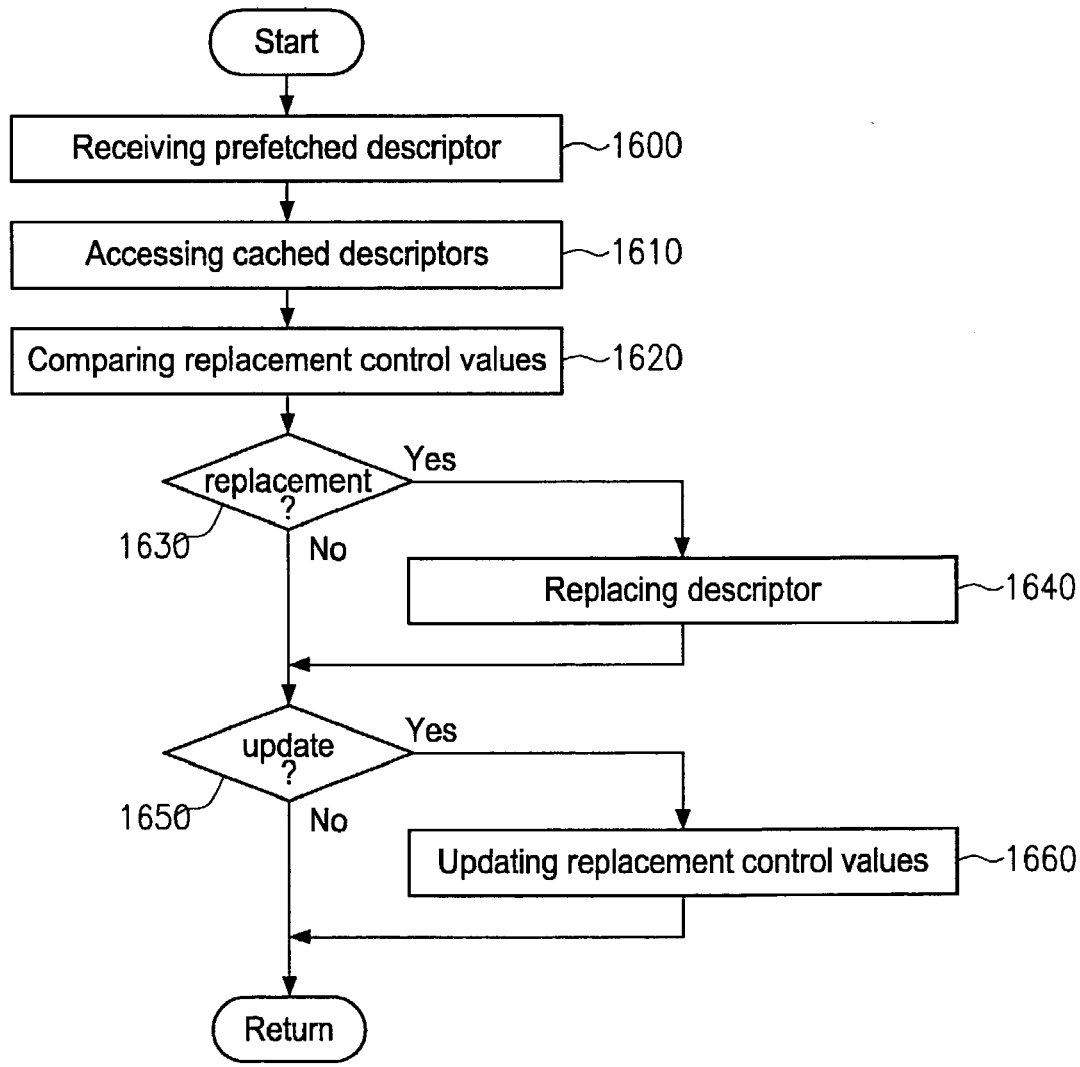
FIG. 16 is a flow chart illustrating the descriptor replacement process according to an embodiment.

Turning now to FIG. 16 which is a flowchart illustrating the process of operating the descriptor cache 545 of the above embodiments, for performing the descriptor replacement process, the process starts with receiving a prefetched descriptor in step 1600. This step may include sending out a request for the descriptor to be prefetched. Once the descriptor is received, the descriptors that are already cached are accessed in step 1610. For each or at least a part of the stored descriptors, the replacement control values are compared with the replacement control value of the newly prefetched descriptor (step 1620). As mentioned above, replacement control values may be sympathy values or may be pre-calculated values. If it is determined in step 1630 based on the comparison of step 1620 and the free storage capacity in the descriptor cache 545, that one of the stored descriptors is to be replaced with the newly prefetched descriptor, the replacement is performed in step 1640. Then, it is determined in step 1650 whether the replacement control values in the descriptor cache 545 need to be updated. If so, a value update is performed in step 1660.

It is to be noted that the flowchart of FIG. 16 is provided for explanatory reasons only, and other embodiments are possible where the sequence of steps may differ from that of FIG. 16 and where some of the steps may even be dropped.

As apparent from the foregoing description of the embodiments, a prefetched mechanism is provided that supports periodic as well as asynchronous schedules. A descriptor cache 545 and a descriptor storage unit 535 are provided. The descriptor cache 545 may be a look-aside cache, and may be fully associative and provided with write-through probabilities. The technique of the above described embodiments may improve the efficiency of the overall performance without requiring inappropriately large storage capacity in the cache.

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A host controller comprising:
a descriptor fetch unit adapted to send out requests for descriptors and receive descriptors in reply to said requests, said descriptors being data structures for describing attributes of the data transfer to and from devices controlled by said host controller; and
a descriptor cache adapted to store prefetched descriptors, wherein said descriptor cache is arranged to store periodically scheduled descriptors and asynchronously scheduled descriptors, wherein said descriptor cache is adapted to let said periodically scheduled descriptors expire at frame boundaries,
wherein said descriptor cache is further adapted to store individual replacement control values for at least a part of the stored prefetched descriptors, wherein each said replacement control value is a sympathy value indicative of the usefulness of storing the respective descriptor in said descriptor cache, wherein said descriptor fetch unit is adapted to calculate said sympathy value and wherein said descriptor fetch unit is connected to said descriptor cache to write the calculated sympathy value into said descriptor cache, and
wherein the host controller is arranged to replace a stored prefetched descriptor in said descriptor cache by a newly prefetched descriptor based on the replacement control value associated with the stored prefetched descriptor.

2. The host controller of claim 1, wherein the host controller is arranged to replace the stored prefetched descriptor in said descriptor cache by the newly prefetched descriptor based on a comparison of the sympathy value of the stored prefetched descriptor and a sympathy value of the newly prefetched descriptor.

3. The host controller of claim 2, wherein the host controller is arranged to replace the stored prefetched descriptor in said descriptor cache by the newly prefetched descriptor if the sympathy value of the newly prefetched descriptor exceeds that of the stored prefetched descriptor.

4. The host controller of claim 2, wherein the host controller is arranged not to replace the stored prefetched descriptor in said descriptor cache by the newly prefetched descriptor if there is free capacity in said descriptor cache to store the newly prefetched descriptor.

5. The host controller of claim 1, wherein said descriptor cache is further adapted to store a periodically updated sympathy value.

6. The host controller of claim 1, wherein said descriptor fetch unit is adapted to calculate said sympathy value when accessing a descriptor stored in said descriptor cache.

7. The host controller of claim 1, wherein said replacement control value is a pre-calculated value.

8. The host controller of claim 1 wherein said descriptor cache is further adapted to store age data for each of said asynchronously scheduled descriptors, and the host controller is adapted to let said asynchronously scheduled descriptors expire according to the respective age data.

9. The host controller of claim 8, wherein said age data are chosen not to exceed a given age limit.

10. The host controller of claim 9, wherein said age limit corresponds to the length of four data frames.

11. The host controller of claim 1, wherein said descriptor cache comprises an RAM (Random Access Memory) unit providing the storage capacity to store said prefetched descriptors, said RAM unit being connected to receive addresses over address lines, one part of said address line being used for descriptor base addressing, another part of said address lines being used to address data words inside the descriptors.

12. The host controller of claim 1, wherein said descriptor cache comprises an RAM (Random Access Memory) unit providing the storage capacity to store said prefetched descriptors, said RAM unit comprising separate read and write ports allowing concurrent read and write operations.

13. The host controller of claim 1, wherein said descriptor cache comprises a memory interface controller adapted to write data relating to stored prefetched descriptors to a memory interface unit of the host controller.

14. The host controller of claim 1, wherein said descriptor cache comprises a dataflow controller adapted to control the data transfer to and from said descriptor cache.

15. The host controller of claim 14, wherein said dataflow controller is adapted to control the data transfer between said descriptor cache and said descriptor fetch unit.

16. The host controller of claim 14, wherein said descriptor cache is connected to a transaction completion machine that is adapted to manage the status write-back of descriptors, and said dataflow controller is adapted to control the data transfers between said descriptor cache and said transaction completion machine.

17. The host controller of claim 14, wherein said descriptor cache is connected to a memory interface controller adapted to write data relating to stored prefetched descriptors to a memory interface unit of the host controller, and said dataflow controller is adapted to control the data transfers between said descriptor cache and said memory interface controller.

18. The host controller of claim 14, wherein said dataflow controller is adapted to control the data transfer using tag information of the descriptors.

19. The host controller of claim 14, wherein said descriptor cache further comprises a read multiplexer and a write multiplexer adapted to multiplex various descriptor sources and sinks to and from an RAM (Random Access Memory) unit providing the storage capacity to store said prefetched descriptors, said multiplexers being controlled by said dataflow controller.

20. The host controller of claim 19, wherein said dataflow controller is further adapted to control address and data lines of said RAM unit.

21. The host controller of claim 1, wherein said descriptor cache is connected to said descriptor fetch unit and adapted to accept read and write requests from said descriptor fetch unit.

22. The host controller of claim 1, wherein said descriptor cache is connected to a transaction completion machine that is adapted to manage the status write-back of descriptors, said descriptor cache being further adapted to accept read and write requests from said transaction completion machine.

23. The host controller of claim 22, wherein said transaction completion machine is adapted to invalidate a descriptor in said descriptor cache when retiring the descriptor.

24. The host controller of claim 22, further comprising:
a descriptor storage unit adapted to store fetched descriptors, wherein said transaction completion machine is connected to said descriptor storage unit to get the currently processed descriptor.

25. The host controller of claim 22, further comprising:
a DMA (Direct Memory Access) transmit and receive engine adapted to transmit data requests and receive requested data,
wherein said transaction completion machine is connected to said DMA transmit and receive engine to get the amount of data moved.

26. The host controller of claim 22, wherein said status write-back comprises a descriptor update and retirement.

27. The host controller of claim 26, wherein said transaction completion machine is adapted to write updated descriptors into said descriptor cache.

28. The host controller of claim 27, wherein said descriptor cache is arranged to write updated descriptors received from said transaction completion machine to a memory interface in a write-through mode.

29. The host controller of claim 1, wherein said descriptor cache is a fully associative cache.

30. The host controller of claim 1, wherein said descriptor cache has write-through capabilities.

31. The host controller of claim 30, wherein said descriptor cache is adapted to operate as write-through cache in a predefined operational mode where the normal cache operation is disabled.

32. The host controller of claim 30, wherein said descriptor cache is connected to a transaction completion machine that is adapted to manage the status write-back of descriptors, and said descriptor cache is adapted to allow write-through operations from said descriptor fetch unit and said transaction completion machine.

33. The host controller of claim 1, wherein said descriptor cache is connected to be operated as look-aside cache.

34. The host controller of claim 1, further comprising:
a transaction completion machine adapted to control a descriptor update process, said transaction completion machine comprising a processor responsible for status updates of transactions of various kinds including split and nonsplit transactions, bulk, control and interrupt transactions, and incoming, outgoing and setup transactions.

35. The host controller of claim 1, being a USB (Universal Serial Bus) host controller, further comprising:
a transaction completion machine adapted to control a descriptor update process, said transaction completion machine comprising a head processor responsible for status updates of all transactions captured by an EHCI (Enhanced Host Controller Interface) compliant queue head data structure.

36. The host controller of claim 1, further comprising:
a transaction completion machine adapted to control a descriptor update process, said transaction completion machine comprising a processor responsible for status updates of nonsplit isochronous transactions.

37. The host controller of claim 1, further comprising:
a transaction completion machine adapted to control a descriptor update process, said transaction completion machine comprising a processor responsible for status updates of split isochronous transactions.

38. The host controller of claim 1, further comprising a transaction completion machine adapted to control a descriptor update process, said transaction completion machine comprising:
a first processor responsible for status updates of split and nonsplit, non-isochronous transactions;
a second processor responsible for status updates of nonsplit isochronous transactions; and
a third processor responsible for status updates of split isochronous transactions.

39. The host controller of claim 1, further comprising:
a descriptor storage unit connected to said descriptor fetch unit,
wherein said descriptor fetch unit is adapted to fetch descriptors on either a periodic or an asynchronous schedule, and is capable of determining when to switch between the schedules.

40. The host controller of claim 1, wherein said descriptor fetch unit is adapted to perform a next descriptor finding algorithm to determine the next descriptor to be fetched.

41. The host controller of claim 1, wherein said descriptor fetch unit is adapted to calculate at least one estimated transaction duration value for a given descriptor.

42. The host controller of claim 1, further comprising:
a descriptor storage unit adapted to store fetched descriptors, wherein said fetched descriptors are requested if required, and said prefetched descriptors are requested in advance.

43. The host controller of claim 1, being a host controller for controlling the data traffic to and from at least one peripheral device connected to said host controller by means of a serial bus.

44. The host controller of claim 1, being a USB (Universal Serial Bus) host controller, wherein said devices controlled by the USB host controller are USB devices.

45. The host controller of claim 44, being a USB-2 compliant host controller.

46. A southbridge device having a USB (Universal Serial Bus) host controller circuit comprising:
a descriptor fetch unit adapted to send out requests for descriptors and receive descriptors in reply to said requests, said descriptors being data structures for describing attributes of the data transfer to and from USB devices; and
a descriptor cache adapted to store prefetched descriptors, wherein said descriptor cache is further adapted to store individual replacement control values for at least a part of the stored prefetched descriptors, wherein each said replacement control value is a sympathy value indicative of the usefulness of storing the respective descriptor in said descriptor cache, wherein said descriptor fetch unit is adapted to calculate said sympathy value and wherein said descriptor fetch unit is connected to said descriptor cache to write the calculated sympathy value into said descriptor cache, and
wherein the USB host controller circuit is arranged to replace a stored prefetched descriptor in said descriptor cache by a newly prefetched descriptor based on the replacement control value associated with the stored prefetched descriptor,
wherein said descriptor cache is connected to a transaction completion machine that is adapted to manage the status write-back of descriptors, said descriptor cache being further adapted to accept read and write requests from said transaction completion machine.

47. A method of operating a host controller, the method comprising:
prefetching descriptors by sending out requests for descriptors and receiving descriptors in reply to said requests, said descriptors being data structures for describing attributes of the data transfer to and from devices controlled by said host controller;
accessing a descriptor cache of the host controller, said descriptor cache storing prefetched descriptors, said descriptor cache further storing individual replacement control values for at least a part of the stored prefetched descriptors, wherein each said replacement control value is a sympathy value indicative of the usefulness of storing the respective descriptor in said descriptor cache;
calculating said sympathy value;
writing the calculated sympathy value into said descriptor cache;
replacing a stored prefetched descriptor in said descriptor cache by a newly prefetched descriptor based on the replacement control value associated with the stored prefetched descriptor, and controlling the data transfer to and from said descriptor cache using tag information of the descriptors; and
wherein said descriptor cache is arranged to store periodically scheduled descriptors and asynchronously scheduled descriptors, wherein said descriptor cache is adapted to let said periodically scheduled descriptors expire at frame boundaries.

48. The method of claim 47, wherein replacing the stored prefetched descriptor in said descriptor cache by the newly prefetched descriptor comprises:
comparing the sympathy value of the stored prefetched descriptor with a sympathy value of the newly prefetched descriptor.

49. The method of claim 48, wherein the stored prefetched descriptor is replaced by the newly prefetched descriptor if the sympathy value of the newly prefetched descriptor exceeds that of the stored prefetched descriptor.

50. The method of claim 48, wherein the stored prefetched descriptor is not replaced by the newly prefetched descriptor if there is free capacity in said descriptor cache to store the newly prefetched descriptor.

51. The method of claim 47, further comprising: periodically updating the sympathy values.

52. The method of claim 47, wherein said sympathy value is calculated when a descriptor stored in said descriptor cache is accessed.

53. The method of claim 47, wherein said replacement control value is a pre-calculated value.

54. The method of claim 47, wherein said descriptor cache stores periodically scheduled descriptors and asynchronously scheduled descriptors.

55. The method of claim 54, further comprising:
letting said periodically scheduled descriptors expire at frame boundaries.

56. The method of claim 54, wherein said descriptor cache further stores age data for each of said asynchronously scheduled descriptors, and the method further comprises:
letting said asynchronously scheduled descriptors expire according to the respective age data.

57. The method of claim 56, wherein said age data are chosen not to exceed a given age limit.

58. The method of claim 57, wherein said age limit corresponds to the length of four data frames.

59. The method of claim 47, further comprising:
managing the status write-back of descriptors by sending read and write requests to said descriptor cache;

60. The method of claim 59, wherein managing the status write-back of descriptors comprises:
invalidating a descriptor in said descriptor cache when retiring the descriptor.

61. The method of claim 59, wherein managing the status write-back of descriptors comprises:
taking into account the amount of data moved to and from memory.

62. The method of claim 59, wherein managing the status write-back of descriptors comprises:
updating and retiring descriptors.

63. The method of claim 62, wherein managing the status write-back of descriptors further comprises:
writing updated descriptors into said descriptor cache.

64. The method of claim 63, wherein managing the status write-back of descriptors further comprises:

writing updated descriptors to a memory interface in a write-through mode of said descriptor cache.

65. The method of claim 47, wherein said descriptor cache is a fully associative cache.

66. The method of claim 47, wherein said descriptor cache has write-through capabilities.

67. The method of claim 66, further comprising:
operating said descriptor cache as write-through cache in a predefined operational mode where the normal cache operation is disabled.

68. The method of claim 47, further comprising:
operating said descriptor cache as look-aside cache.

69. The method of claim 47, further comprising:
controlling a descriptor update process by updating a status of transactions of various kinds including split and nonsplit transactions, bulk, control and interrupt transactions, and incoming, outgoing and setup transactions.

70. The method of claim 47, for operating a USB (Universal Serial Bus) host controller, further comprising:
controlling a descriptor update process by updating a status of all transactions captured by an EHCI (Enhanced Host Controller Interface) compliant queue head data structure.

71. The method of claim 47, further comprising:
controlling a descriptor update process by updating a status of nonsplit isochronous transactions.

72. The method of claim 47, further comprising:
controlling a descriptor update process by updating a status of split isochronous transactions.

73. The method of claim 47, wherein prefetching descriptors is performed on either a periodic or an asynchronous schedule, and comprises:
determining when to switch between the schedules.

74. The method of claim 47, wherein prefetching descriptors comprises:
performing a next descriptor finding algorithm to determine the next descriptor to be fetched.

75. The method of claim 47, wherein prefetching descriptors comprises:
calculating at least one estimated transaction duration value for a given descriptor.

76. The method of claim 47, for operating a USB-2 (Universal Serial Bus revision 2) compliant host controller, wherein said devices controlled by the USB host controller are USB devices.

77. A computer system comprising a host controller for controlling the data traffic to and from at least one peripheral device connected to the computer system over a serial bus, the host controller comprising:
a descriptor fetch unit adapted to send out requests for descriptors and receive descriptors in reply to said requests, said descriptors being data structures for describing attributes of the data transfer to and from peripheral devices controlled by said host controller; and
a descriptor cache adapted to store prefetched descriptors, wherein said descriptor cache is further adapted to store individual replacement control values for at least a part of the stored prefetched descriptors, wherein each said replacement control value is a sympathy value indicative of the usefulness of storing the respective descriptor in said descriptor cache, wherein said descriptor fetch unit is adapted to calculate said sympathy value and wherein said descriptor fetch unit is connected to said descriptor cache to write the calculated sympathy value into said descriptor cache, and
wherein the host controller is arranged to replace a stored prefetched descriptor in said descriptor cache by a newly prefetched descriptor based on the replacement control value associated with the stored prefetched descriptor,
wherein said descriptor cache is connected to a transaction completion machine that is adapted to manage the status write-back of descriptors, said descriptor cache being further adapted to accept read and write requests from said transaction completion machine.

78. A method of operating a host controller, the method comprising:
prefetching descriptors by sending out requests for descriptors and receiving descriptors in reply to said requests, said descriptors being data structures for describing attributes of the data transfer to and from devices controlled by said host controller, wherein prefetching descriptors comprises calculating at least one estimated transaction duration value for a given descriptor;
accessing a descriptor cache of the host controller, said descriptor cache storing prefetched descriptors, said descriptor cache further storing individual replacement control values for at least a part of the stored prefetched descriptors, wherein each said replacement control value is a sympathy value indicative of the usefulness of storing the respective descriptor in said descriptor cache;
calculating said sympathy value;
writing the calculated sympathy value into said descriptor cache; and
replacing a stored prefetched descriptor in said descriptor cache by a newly prefetched descriptor based on the replacement control value associated with the stored prefetched descriptor.

79. A method of operating a host controller, the method comprising:
prefetching descriptors by sending out requests for descriptors and receiving descriptors in reply to said requests, said descriptors being data structures for describing attributes of the data transfer to and from devices controlled by said host controller, wherein prefetching descriptors is performed on either a periodic or an asynchronous schedule, and comprises determining when to switch between the schedules;
accessing a descriptor cache of the host controller, said descriptor cache storing prefetched descriptors, said descriptor cache further storing individual replacement control values for at least a part of the stored prefetched descriptors, wherein each said replacement control value is a sympathy value indicative of the usefulness of storing the respective descriptor in said descriptor cache;
calculating said sympathy value;
writing the calculated sympathy value into said descriptor cache; and
replacing a stored prefetched descriptor in said descriptor cache by a newly prefetched descriptor based on the replacement control value associated with the stored prefetched descriptor.

* * * * *